United States Patent Office 3,755,415
Patented Aug. 28, 1973

3,755,415
ADAMANTYL UREA DERIVATIVES
Carl Richter, Kurt Pluss, and Georg Feth, Schaffhausen, Switzerland, assignors to Cilag-Chemie, A.G.
No Drawing. Original application Oct. 28, 1969, Ser. No. 874,084, now Patent No. 3,703,537. Divided and this application Mar. 27, 1972, Ser. No. 243,522
Int. Cl. C07c 127/16
U.S. Cl. 260—468 E     1 Claim

ABSTRACT OF THE DISCLOSURE

Compounds useful as antiviral agents defined by the formulas:

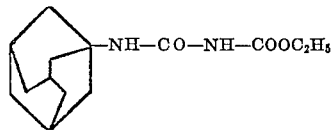

and

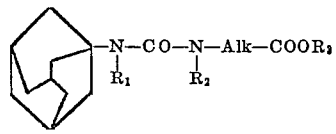

wherein Alk is alkylene, $R_1$ and $R_2$ are each hydrogen or lower alkyl, and $R_3$ is hydrogen or a variously defined ester moiety.

CROSS-REFERENCE TO RELATED APPLICATION

This is a divisional application of my co-pending application Ser. No. 874,084, filed Oct. 28, 1969 now Pat. No. 3,703,537.

SUMMARY

An object of this invention is to provide a new class of N-(1 - adamantyl)-ureas, in particular, those N-(1-adamantyl)-ureas which have an ethoxycarbonyl, a carboxyalkyl or an esterified carboxy-alkyl function attached to the N' nitrogen of the urea moiety. Said N-(1-adamantyl)-ureas possess antiviral activity and may be used alone or in combination with other therapeutically active agents and, accordingly, they are valuable adjuncts in the antiviral field.

DESCRIPTION OF THE PREFERRED EMBODIMENTS

The novel N-(1-adamantyl)-ureas of this invention may be structurally represented by the formulas:

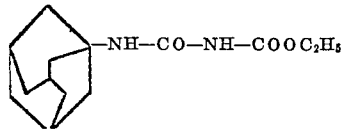

(I-a)

and

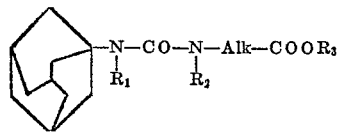

(I-b)

wherein $R_1$ and $R_2$ are each a member selected from the group consisting of hydrogen and lower alkyl, preferably methyl and ethyl; Alk is a straight or branch chained saturated alkylene of from 1 to 10 carbon atoms; and $R_3$ is a member selected from the group consisting of hydrogen, a straight or branch chained saturated alkyl of from 1 to 12 carbon atoms, di-(lower alkyl)-amino-lower alkyl, benzyl, 4-(N-methyl)-piperidyl and an alkoxyalkyl group of the formula: $R'-(O-R'')_n-O-R'''$, in which $R'$, $R''$ and $R'''$ are each a member selected from the group consisting of methyl and ethyl, and $n$ is an integer from zero to 3, preferably, wherein both $R'$ and $R''$ are ethyl, $R'''$ is methyl, and $n$ is 1 to 3. Also included within the scope of this invention are the therapeutically active acid addition salts of those derivatives or Formula I-b containing a basic nitrogen such as when $R_3$ is di-(lower alkyl)-amino-lower alkyl.

As used herein, "lower alkyl" is a straight or branch chained saturated hydrocarbon having from 1 to about 5 carbon atoms, such as, for example, methyl, ethyl, propyl, isopropyl, butyl, pentyl and the like.

The compound of Formula I-a may be prepared as in Example XXIV hereinafter described. The compounds of Formula I-b may be prepared by one or more of the following synthetic procedures:

Method A

1 - adamantyl - isocyanate (Chemische Berichte, 95, 2303) is reacted in a suitable solvent such as dioxane with an appropriate primary or secondary amine of the formula: $HNR_2$—Alk—$COOR_3$, in which $R_2$, Alk and $R_3$ are as previously described. The starting amine may be used in the form of an acid addition salt, for example, a hydrohalide salt, in which case an alkali such as sodium hydroxide is employed to liberate the free amine. According to this method, it is obvious that only those compounds of Formula I-b wherein $R_1$ is hydrogen may be obtained.

Method B

An appropriate N-(1-adamantyl)-N-$R_1$-amine is reacted with an isocyanate of the formula:

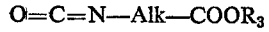

$$O{=}C{=}N-Alk-COOR_3$$

wherein $R_1$, Alk and $R_3$ are as previously described except that $R_3$ is other than hydrogen. The reaction is performed in an anhydrous organic solvent, for example, dioxane, cyclohexane or an aromatic hydrocarbon such as toluene. According to this method, only those compounds of Formula I-b wherein $R_2$ is hydrogen may be obtained.

Method C

An appropriate N - (1 - adamantyl)-N-$R_1$-carbamyl chloride is reacted with an appropriate amino-acid ester of the formula: $HNR_2$—Alk—$COOR_3$, wherein $R_1$, $R_2$, Alk and $R_3$ are as previously described except that $R_3$ is other than hydrogen. Anhydrous solvents described in the preceding method may again be employed.

Method D

An appropriate N-(1-adamantyl)-N-$R_1$-amine is reacted with an appropriate carbamyl chloride of the formula. ClOC—$NR_2$—Alk—$COOR_3$, wherein $R_1$, $R_2$, Alk and $R_3$ are as previously described except that $R_3$ is other than hydrogen, again in anhydrous solvents previously described.

The foregoing procedures may be diagrammatically illustrated as follows:

Method A

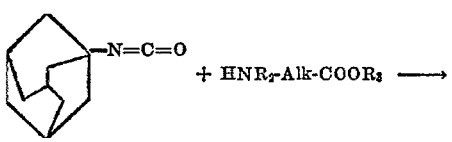

Method B

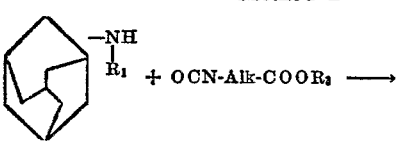

Method C

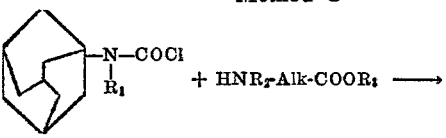

Method D

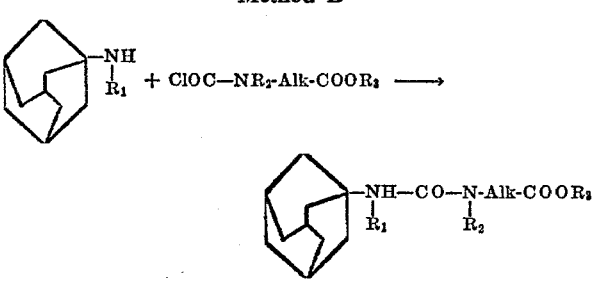

The acids of Formula I-b, that is, where $R_3$=H, obtained by the foregoing procedures may be converted to the esters of Formula I-b by esterification with a suitable alcohol, $R_3$—OH, according to standard procedures. Likewise, the esters of Formula I-b, that is, where $R_3$ is other than H, may be converted to the corresponding free acid form by conventional hydrolysis.

Those compounds of Formula I-b which contain a basic nitrogen, such as those esters wherein $R_3$ is di-(lower alkyl)-amino-lower alkyl, may be converted to the form of a therapeutically active acid addition salt by reaction with an appropriate acid, such as, for example, an inorganic acid such as hydrochloric, hydrobromic, sulfuric, nitric and the like acids, or an organic acid such as acetic, propionic, glycolic, lactic, oxalic, malonic, succinic, maleic, fumaric, malic, tartaric, citric, benzoic, cinnamic, methanesulfonic, ethanesulfonic, p-toluenesulfonic, salicylic and the like acids. Conversely, such acid addition salts may be transformed into the corresponding free base form in the usual manner, e.g., by reaction with suitable alkali, such as, for example, sodium or potassium hydroxide.

The subject compounds of Formulas I-a and I-b have been found to possess valuable antiviral properties as demonstrated in vitro against such viruses as parainfluenza virus, vaccinia virus, influenza virus $A_2$ and herpes virus according to the filter paper disc-agar plate technique described by E. C. Herrmann, Jr. et al., Proc. Soc. Exper. Biol. & Med., 103–4, 625 (1960). According to this technique, tissue cell monolayers are grown in suitable dishes, infected with virus and overlaid with agar. Filter paper discs (about 10 mm. in diameter) impregnated with the compound to be tested are deposited on the hardened agar surface of the cell-virus culture medium. After proper incubation the virus produces plagues in the medium except in the area around a disc containing an antiviral agent, the size of the plague-free zone ("inhibition zone") being proportional to the concentration of the antiviral agent present in the filter paper disc. In accordance with this procedure, the subject compounds were observed to produce an inhibition zone of at least 10 mm. diameter at a 200 microgram (mcg.) level using the following cell cultures: chicken fibroplasts for the influenza virus $A_2$ and the vaccinia virus; a strain of monkey kidney cells for the parainfluenza virus; and He La cells for the herpes virus. It is understood that the compounds in the following table are not listed for purposes of limiting the invention thereto, but only to exemplify the useful antiviral activity of all the compounds embraced within the scope of Formulas I-a and I-b.

| Compound (Ad=1-adamantyl) | mcg. | Virus [1] | Inhibition zone (mm. diameter) |
|---|---|---|---|
| Ad—NH—CO—N($CH_3$)—$CH_2$—COO$C_2H_5$ | 200 | A | 35 |
| Ad—N($CH_3$)—CO—NH—$CH_2$—COO$C_2H_5$ | 200 | A | 22 |
| Ad—NH—CO—N($CH_3$)—$CH_2$—COO$C_2H_5$ | 100 | B | 40 |
| Ad—NH—CO—NH—$CH_2$—COO$C_2H_5$ | 200 | B | 30 |
| Ad—NH—CO—NH—$CH_2$—COO$C_{12}H_{25}$ | 200 | B | 20 |
| Ad—NH—CO—NH—$CH_2$—COO—($CH_2CH_2O)_4$—$CH_3$ | 200 | B | 25 |
| Ad—NH—CO—NH—$CH_2$—COOCH$_2$— | 200 | B | 15 |
| Ad—N($CH_3$)—CO—NH—$CH_2$—COO$C_2H_5$ | 200 | B | 35 |
| Ad—NH—CO—NH—$CH_2$—COOCH$_2$CH$_2$N(CH$_3$)$_2$ | 200 | B | 25 |
| Ad—NH—CO—NH—CH$_2$CH$_2$CH$_2$—COO$C_2H_5$ | 200 | B | 15 |
| Ad—N($CH_3$)—CO—N($CH_3$)—$CH_2$—COO$C_2H_5$ | 200 | B | 35 |
| Ad—NH—CO—NH—$CH_2$—COOH | 200 | C | 35 |
| Ad—NH—CO—NH—$CH_2$—COO$C_2H_5$ | 200 | C | 12 |
| Ad—NH—CO—NH—$CH_2$—COO—($CH_2CH_2O)_4$—$CH_3$ | 200 | C | 20 |
| Ad—NH—CO—N($CH_3$)—$CH_2$—COO$C_2H_5$ | 200 | C | 35 |
| Ad—NH—CO—NH—CH$_2$—COOCH$_2$CH$_2$N(CH$_3$)$_2$ | 200 | C | 30 |
| Ad—NH—CO—N($CH_3$)—$CH_2$—COO$C_2H_5$ | 200 | D | 24 |
| Ad—N($CH_3$)—CO—NH—$CH_2$—COO$C_2H_5$ | 200 | D | 25 |
| Ad—N($CH_3$)—CO—N($CH_3$)—$CH_2$—COO$C_2H_5$ | 200 | D | 40 |
| Ad—NH—CO—NH—COO$C_2H_5$ | 200 | D | 20 |

[1] Virus A=parainfluenza virus; B=vaccinia virus; C=influenza virus $A_2$; D=herpes virus.

The following examples are intended to illustrate the previously described methods of preparing the compounds of Formulas I–a and I–b.

EXAMPLE I

A solution of 60 g. (0.339 mol) 1-adamantylisocyanate in 240 ml. of dioxane heated to 30° C. is added dropwise with stirring during the course of 30 minutes to a solution of 38.4 g. (0.513 mol) aminoacetic acid in 150 ml. dioxane and 150 ml. water having a temperature of 80° C. The mixture is stirred for 3 hours at 75–80° C. After cooling, 1200 ml. of water are added. The reaction mixture is then allowed to stand for 1 hour at room temperature, the precipitate is filtered off by suction and the mass of crystals is washed with water. For purification, the crude product is dissolved in 700 ml. of water and 135 ml. 2 N sodium hydroxide solution, filtered with charcoal and the filtrate acidified to a pH of 1. The resulting precipitate is suction filtered, washed with water and dried at 60° C. under reduced pressure. The product is now dissolved in 200 ml. of boiling ethanol, filtered with charcoal and precipitated again by addition of 200 ml. of water. The precipitate is allowed to stand for 5 hours, then removed by suction and dried at 60° C. under reduced pressure. There are obtained 48.2 grms of N-(1-adamantyl)-N′-(carboxymethyl)-urea having a decomposition point of 176°–178° C.

EXAMPLE II 17.1 grams (0.085 mol) of 11-amino-undecanoic-acid are triturated in 500 ml. of water and 90 ml. of 1 N sodium hydroxide and 10 g. (0.0565 mol) 1-adamantyl-isocyanate is added. The mixture is stirred for 14 hours at room temperature and then filtered. The clear filtrate is acidified to pH 3 by adding about 52 ml. of 2 N hydrochloric acid. The white precipitate is filtered, washed with water and dried at 60° C. under reduced pressure. After recrystallization from 60 ml. ethyl alcohol there are obtained 17.4 g. N - (1 - adamantyl)-N′-[10-carboxydecyl(-1)]-urea having a decomposition point of 135–137° C.

EXAMPLE III

In accordane with the procedures outlined in Examples I and II, except that an equivalent quantity of an appropriate amino-acid is used as the starting material, the following products are obtained:

| Amino-acid: | Product |
|---|---|
| Sarcosine (N-Me-glycine) | N-(1 - adamantyl)-N′-(carboxymethyl)-N′ - methyl urea; dec. 161–164° C. |
| β-aminopropionic acid | N-(1 - adamantyl)-N′-(carboxyethyl)-urea; M.P. 166° C. |
| 6-aminohexanoic acid | N-(1 - adamantyl)-N′-[5-carboxypentyl(-1)]-urea; M.P. 149–150° C. |

EXAMPLE IV

A solution of 100 g. (0.564 mol) 1-adamantyl-isocyanate in 630 ml. dioxane is added with stirring dropwise to a solution of 62.7 g. (0.607 mol) glycine ethyl ester in 316 ml. dioxane during the course of 40 minutes. The reaction mixture is stirred for three hours and then allowed to stand for 24 hours. The resulting white crystal mass is filtered by suction, washed with dioxane and dried under reduced pressure. After recrystallization from 230 ml. of dioxane, about 129 g. of N-(1-adamantyl)-N′-(carbethoxy-methyl)-urea is obtained having a melting point of 154–156° C. The hydrochloride salt of glycine ethyl ester may also be used in the foregoing procedure in which case it is advantageous to conduct the reaction in pyridine or in a mixture of dioxane and sodium hydroxyde solution.

EXAMPLE V

A solution of 0.95 g. (0.0238 mol) of sodium hydroxide in 3 ml. water is added with stirring to a solution of 6 g. (0.0239 mol) aminoacetic acid decyl ester hydrochloride in 25 ml. of dioxane. To this mixture is added over 30 minutes a solution of 2.85 g. (0.016 mol) 1-adamantyl-isocyanate in 30 ml. dioxane. The reaction mixture is stirred for 3 hours and then the clear solution is poured off from the precipitated sodium chloride. The solution is dried over sodium sulfate and the solvent removed by distillation under reduced pressure at a bath temperature of 50° C. The resutant yellow oil is crystallized after a few hours. After recrystallization from 20 ml. and 17 ml. ligroin 30–45° C., about 4 g. of N-(1-adamantyl)-N′-(carbodecyloxymethyl)-urea is obtained, M.P. 58–61° C.

EXAMPLE VI 0.95 gram (0.0238 mol) of sodium hydroxide dissolved in 3 ml, of water is added at room temperature to a stirred suspension of 4 g. (0.0239 mol) α-aminobutyric acid ethyl ester hydrochloride in 25 ml. dioxane. To this mixture is added over 20 minutes a solution of 2.85 g. (0.016 mol) of 1-adamantyl-isocyanate in 30 ml. dioxane. The reaction mixture is stirred for another hour at room temperature and 100 ml. of water are then added. The resultant crystal mass is filtered by suction, washed with water and dried at 50° C. under reduced pressure. After recrystallization from 17 ml. of dioxane, there is obtained 3.6 g. N-(1-adamantyl)-N′-[1-carbethoxy-propyl(-1)]-urea, M.P. 185–187° C.

EXAMPLE VII 1.5 grams of N-(1-adamantyl)-N′-[1-carbethoxy-propyl(-1)]-urea are dissolved in a mixture of 20 ml. ethyl alcohol, 5 ml. 2 N sodium hydroxide solution and 10 ml. water. After standing at room temperature for two days the solution is diluted with 50 ml. of water and acidified with 2 N hydrochloric acid to pH 4. The precipitate is filtered by suction, washed with water, and dried under reduced pressure to yield 1.1 g. of N-(1-adamantyl)-N′-[1-carboxy-propyl(-1)]-urea, dec. 161–164° C. This substance crystallizes with 1 mol crystal water.

EXAMPLE VIII

To a stirred solution of 5.21 g. (0.03 mol) of 1-adamantyl-isocyanate in 24 ml. dioxane is added over 40 minutes at 20–30 C. a solution of 3.93 g. (0.03 mol) ethylaminoacetic acid ethyl ester (prepared according to Annalen der Chemie, 453, 205) in 46 ml. of dioxane. The reaction mixture is allowed to stand for 10 hours at room temperature and then the solvent is removed by distillation under reduced pressure at a bath temperature of 40° C. The resulting yellow oil completely crystallizes after 3 days. The crystal mass is triturated with 5 ml. ligroin 40–60° C., filtered by suction, and washed with a little ligroin 40–60° C. The crystal cake is dissolved in 60 ml. boiling ligroin 40–60° C., filtered with charcoal and cooled to a temperature of 0° C. The crystal mass is filtered by suction and dried under reduced pressure to yield 5.5 g. N-(1 - adamantyl)-N′-ethyl-N′-(carbethoxymethyl)-urea having a melting point of 71–72.5° C. The corresponding free acid produced by saponification has a decomposition point of 154° C.

EXAMPLE IX

In accordance with the procedures outlined in Examples V and VI, except that an equivalent quantity of glycinmethylester hydrochloride and glycinoctylester hydrochloride are used as a starting material, the following respective products are obtained:

N-(1-adamantyl)-N′-(carbomethoxymethyl)-urea, M.P. 196–198° C.; and

N-(1-adamantyl)-N′-carbooctylmethyl)-urea, M.P. 70–72° C.

EXAMPLE X

By repeating the procedure of Example VIII with an equivalent quantity of the appropriate amino acid ester, the following products are obtained. The free acids, where indicated, are obtained by conventional saponification of the corresponding ester, for example, by the procedure of Example VII.

| Aminoacid ester: | Product |
| --- | --- |
| Glycinbutyl ester | N-(1 - adamantyl)-N'-(carbobutoxymethyl) - urea, M.P. 130.5–131.5° C. |
| Alaninethyl ester | N-(1 - adamantyl) - N'-[1-carbethoxyethyl ( - 1)]-urea, M.P. 155–157° C.; acid dec. point is 173–176° C. |
| β - aminopropionic acid ethyl ester | N-(1 - adamantyl)-N'-(carbethoxyethyl)-urea, M.P. 121–122° C. |
| β - methylaminopropionic acid ethyl ester | N-(1 - adamantyl)-N'-(carbethoxyethyl) - N'-methyl-urea, M.P. 46.47° C.; acid dec. point is 158.161° C. |
| Sarcosin-ethyl ester | N-(1 - adamantyl)-N'-(carbethoxymethyl)-N'-methyl urea, M.P. 93–95° C. |
| 4-aminobutyric acid ethyl ester | N-(1-adamantyl) - N' - (3-carbethoxypropyl) - urea, M.P. 125–128° C.; acid dec. point is 163–165° C. |

EXAMPLE XI

To a stirred solution of 6.2 g. (0.0411 mol) 1-aminoadamantane in 75 ml. of absolute dioxane warmed to 40° C., a solution of 5.3 g. (0.0411 mol) carbethoxymethyl-isocyanate (Beilstein 4, 365) in 25 ml. absolute dioxane is added dropwise over 10 minutes. The reaction temperature raises to 50° C. The reaction mixture is stirred without heating for another 2 hours and then allowed to stand for 24 hours at room temperature. The crystal mass is then filtered by suction, washed with dioxane and dried under reduced pressure. After recrystallization from 16 ml. dioxane there are obtained 7.9 g. N-(1-adamantyl)-N'-(carbethoxymethyl)-urea, M.P. 154–156° C.

EXAMPLE XII

To a stirred solution of 27.8 g. (0.232 mol) isocyanatoacetyl chloride [J. Org. Chem., 30, 1158 (1965)] in 120 ml. absolute ether a solution of 28.0 g. (0.232 mol) diethylenglycol monomethylether in 80 ml. absolute ether is added dropwise over 1 hour. The reaction temperature is maintained at 20–22° C. The solution is stirred for another 3 hours, then the ether is removed by distillation and the residue fractionated under high vacuum. At a boiling point of 121°–122°/0.01 mm., 28 g. 3,6-dioxaheptyl-isocyanatoacetate are obtained

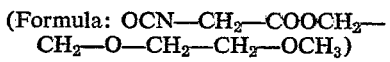

(Formula: OCN—CH$_2$—COOCH$_2$—CH$_2$—O—CH$_2$—CH$_2$—OCH$_3$)

A solution of 17.85 g. (0.118 mol) 1-aminoadamantane dissolved at 40° C. in 210 ml. absolute dioxane is added dropwise over 90 minutes to a solution of 24 g. 3,6-dioxa-heptylisocyanato-acetate in 110 ml. absolute dioxane. The reaction temperature is maintained at 18–22° C. The reaction solution is stirred for another 6 hours and then allowed to stand for 24 hours. After removing the solvent by distillation under reduced pressure, there is obtained a yellow oil which solidifies after cooling to room temperature. The solid residue is dissolved in 117 ml. of boiling toluene and filtered with charcoal. To the hot filtrate is added 320 ml. cyclohexane. The mixture is cooled and the precipitate filtered by suction. After drying under reduced pressure there are obtained 38 g. N-(1-adamantyl) - N' - (3,6-dioxaheptoxy-carbonyl-methyl)-urea, M.P. 82–84° C.

EXAMPLE XIII (A) The procedure of Example XII is repeated with an equivalent quantity of the appropriate glycol ether to yield 3,6,9,12-tetraoxa-tridecanyl-isocyanatoacetate (B.P. 148–153° C./0.005 mm.) which is then reacted with 1-aminoadamantane to yield, as final product, N-(1-adamantyl) - N' - (3,6,9,12,tetraoxa-tridecanyloxy-carbonyl-methyl)-urea, M.P. 48–50° C.; structural formula:

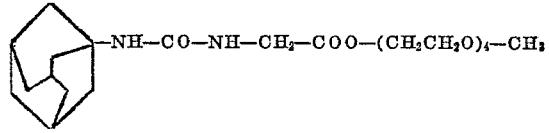

—NH—CO—NH—CH$_2$—COO—(CH$_2$CH$_2$O)$_4$—CH$_3$ (B) Similarly, the substitution of an equivalent amount of 2-dimethylamino-ethanol as a starting material in the procedure of Example XII yields the corresponding 2-dimethylaminoethyl-isocyanatoacetate hydrochloride (dec. point of 55–59° C.) which is then reacted with 1-aminoadamantane to yield, as final product, N-(1-adamantyl)-N'-2-dimethylaminoethoxycarbonyl - methyl)-urea, M.P. 101–102° C.

EXAMPLE XIV (A) To a stirred solution of 2.58 g. (0.02 mol) of carbethoxymethyl-isocyanate in 16 ml. absolute cyclohexane is added dropwise over 30 minutes 3.3 g. (0.02 mol) of a solution of 1-(methylamino)-adamantane in 28 ml. absolute cyclohexane. The temperature of the reaction mixture is raised to 32° C. The mixture is heated to reflux and cooled to room temperature again. The resultant white crystal mass is filtered by suction. After recrystallization from 20 ml. cyclohexane there are obtained 4.6 N-(1 - adamantyl)-N-methyl - N' - (carbethoxymethyl)-urea, M.P. 106–107° C. The corresponding acid has a decomposition point of 130° C.

(B) By reaction of equivalent quantities of carbethoxymethyl-isocyanate with 1-(ethylamino)-adamantane in the same manner as described in Example XIV–A, there is obtained N-(1-adamantyl)-N-ethyl-N'-(carbethoxy-methyl)-urea, M.P. 76–78° C. The corresponding acid has a decomposition point of 155° C.

EXAMPLE XV (A) To a stirred solution of 7.15 g. (0.05 mol) carbonyl-alanin-ethyl-ester (prepared according to Annalen der Chemie, 575, 217) in 35 ml. absolute cyclohexane is added at room temperature over 15 minutes a solution of 8.9 g. (0.05 mol) of 1-(ethylamino)-adamantane in 30 ml. absolute cyclohexane. After stirring for 3 hours the turbid solution is filtered and then concentrated under reduced pressure at a bath temperature of 50° C. After recrystallization of the residue from 35 ml. ligroin 60–90° C., there are obtained 13.0 g. N-(1-adamantyl)-N-ethyl-N'-[-(α-ethoxycarbonyl)-ethyl]-urea with the structural formula:

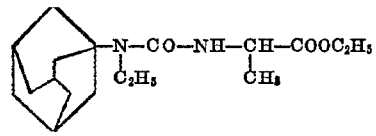

—N—CO—NH—CH—COOC$_2$H$_5$
|                 |
C$_2$H$_5$        CH$_3$

This ester has a melting point of 76–78° C. and the corresponding acid (prepared by saponification of the ester) has a decomposition point of 103° C.

(B) In the same manner as described in Example XV–A, there is obtained N-(1-adamantyl)-N-methyl-N'-[α-(ethoxycarbonyl)-ethyl] urea by the reaction of 1-(methylamino)-adamantane with carbonyl-alanin-ethyl-ester. This product has a melting point of 103–105° C. and the corresponding acid (prepared by saponification of the ester) has a decomposition point of 114° C.

EXAMPLE XVI

To a stirred solution of 4 g. (0.04 mol) phosgene in 25 ml. absolute toluene is dropwise added at room temperature a soltuion of 6 g. (0.0335 mol) of 1-(ethylamino)-adamantane in 15 ml. toluene. The reaction mixture is stirred for 2 hours and then allowed to stand for a further 10 hours. The white precipitate consisting of 1-(ethylamino)-adamantanehydrochloride is removed by filtration and the clear solution concentrated to dryness under reduced pressure. 50 mls. of absolute ether are added to the residue and the turbid solution is filtered and again concentrated to dryness yielding 3.3 g. N-(1-adamantyl)-N-ethyl-carbamyl chloride, M.P. 96–101° C.

By repeating the foregoing procedure, except that an equivalent quantity of 1-(methylamino)-adamantane is used instead of 1-(ethylamino)-adamantane, there is obtained N - (1-adamantyl)-N-methyl-carbamyl chloride, M.P. 102–105° C.

To a stirred solution of 3.15 g. (0.013 mol) of N-(1-adamantyl)-N-ethyl-carbamyl chloride in 10 ml. absolute toluene is dropwise added over 30 minutes at room temperature a solution of 3.8 g. (0.0325 mol) sarcosinethyl ester in 50 ml. absolute toluene. The reaction mixture is warmed to 45° C. and maintained at this temperature for 4 hours. After cooling the precipitated sarcosinethyl ester hydrochloride is removed by filtration and the clear filtrate concentrated under reduced pressure. The residual oil solidifies on cooling. The resultant crystal mass is suspended in 2 ml. ligroin 30–45° C., filtered by suction and recrystallized from 10 ml. ligroin 30–45° C. After drying under reduced pressure there is obtained 2 g. N-(1-adamantyl) - N-ethyl-N'-(carbethoxymethyl)-N'-methyl-urea, M.P. 60–62° C. Saponification of this ester yields the corresponding free acid, M.P. 120–121° C.

EXAMPLE XVII (A) By reaction of N-(1-adamantyl)-N-ethyl-carbamyl chloride with glycinethyl ester in the same manner as descirbed in Example XVI, N-(1-adamantyl)-N-ethyl-N'-(carbethoxymethyl)-urea is obtained.

(B) By reaction of N-(1-adamantyl)-N-methyl-carbamyl chloride with sarcosinethyl ester according to the procedure of Example XVI, N-(1-adamantyl)-N-methyl-N'-(carbethoxymethyl)-N'-methyl-urea is obtained, M.P. 38–40° C. The corresponding acid (prepared by saponification of this ester) melts at 121–123° C.

EXAMPLE XVIII

To a stirred solution of 15 g. (0.151 mol) phosgene in 70 ml. absolute toluene is added dropwise at 20° C. a solution of 14.6 g. (0.125 mol) sarcosinethyl ester in 30 ml. absolute toluene. The reaction mixture is stirred for 4 hours and during this time the white precipitation disappears. The solution is concentrated under reduced pressure to half volume, cooled, and the precipitated sarcosinethyl ester hydrochloride is removed by filtration. The clear filtrate is completely concentrated under reduced pressure, and the residue fractionated under vacuum. A main fraction is obtained of 12.9 g. at 124–129° C./12 mm. which is subjected to a second fractionation to give 10.1 g. of a colorless liquid with a boiling point of 125–128°/12 mm., identified as N-carbethoxymethyl)-N-methyl-carbamyl chloride.

To a stirred solution of 8.76 g. (0.058 mol) 1-aminoadamantane in 35 ml. of absolute toluene is added over 20 minutes a solution of 4.31 g. (0.023 mol) of N-carbethoxymethyl)-N-methyl-carbamyl chloride in 15 ml. absolute toluene. The temperature is maintained at 20° C. during the addition. After additional stirring at room temperature for 3 hours, the precipitated 1-aminoadamantane hydrochloride is removed by filtration. The excess 1-aminoadamantane in the toluene solution is removed by repeated extraction with 40 ml. each of 1 N acetic acid. After drying over sodium sulfate, the solution is concentrated in vacuo. The residue which solidifies on cooling is recrystallized from 7 ml. cyclohexane yielding 3.8 g. N - (1 - adamantyl) - N'-(carbethoxymethyl)-N'-methyl-urea, M.P. 93–94° C.

EXAMPLE XIX (A) To 25 g. 1-dodecyl alcohol warmed to 30° C. is introduced 3.5 g. hydrochloric acid. To this is added 1.4 g. (0.0052 mol) of N-(1-adamantyl)-N'-(carboxyethyl)-urea. The mixture is stirred for 3 hours and allowed to stand for 48 hours. The excess alcohol is removed by distillation at high vacuum and the residue recrystallizes from 70 ml. ligroin 40–60° C. yielding 1.7 g. N-(1-adamantyl)-N'-(dodecyloxycarbonylethyl)-urea, M.P. 72–74° C.

(B) In a similar manner, the following compounds are prepared by esterification of the appropriate urea compound with an appropriate alcohol:

N-(1-adamantyl)-N'-(carbomethoxy-methyl)-urea, M.P. 196–198° C.

N - (1 - adamantyl)-N'-(carbethoxy-methyl)-urea, M.P. 154–156° C.

N - (1 - adamantyl)-N'-(carboisopropoxy-methyl)-urea, M.P. 150–152° C.

N-(1-acadmantyl)-N'-(carbopentoxy-methyl)-urea, M.P. 123–125° C.

N - (1 - adamantyl)-N'-[5-carbethoxy-pentyl(-1)]-urea, M. P. 77–79° C.

N - (1 - adamantyl)-N'-[10-carbethoxy-decyl(-1)]-urea, M.P. 86.5–88.5° C.

EXAMPLE XX 28 grams (0.111 mol) of N-(1-adamantyl)-N'-(carboxymethyl)-urea are added in small portions with stirring to 110 g. (0.926 mol) thionyl chloride. After addition, the reaction mixture is slowly warmed in the course of 1 hour to 40° C. and then kept for 1 hour at this temperature. After this time the evolution of hydrochloric acid and sulfur dioxide is finished. The excess thionyl chloride is removed by distillation under reduced pressure. To remove any residual thionyl chloride, 60 ml. of toluene is added and again distilled off. The remaining crystal mass is suspended in 80 ml. of absolute benzene and filtered by suction. After drying there are obtained 29.3 g. N-(1-adamantyl)-N'-(chlorocarbonyl-methyl)-urea having a decomposition point of 169–173° C.

In the same manner is prepared N-(1-adamantyl)- N'-(α-chlorocarbonyl-ethyl)-urea, decomposition point 109–111° C., by reaction of N-(1-adamantyl)-N'-(α-carboxyethyl)-urea with thionyl chloride.

To 4.45 g. (0.05 mol) of 2-dimethylaminoethanol is added with stirring 2.71 g. (0.01 mol) of N-(1-adamantyl)-N'-(chlorocarbonyl-methyl)-urea. The mixture is stirred for 4 hours at a bath temperature of 50° C., and then cooled and diluted with 50 ml. water. The precipitate is filtered by suction, washed with water and dried under reduced pressure. After recrystallization from 30 ml. diisopropylether there are obtained 1.8 g. N-(1-adamantyl)-N'-(dimethylaminoethoxycarbonyl-methyl) - urea, M.P. 101–102° C.

In the same manner the following products are prepared by reaction of the appropriate chlorocarbonyl-ureas with the appropriate alcohols:

N-(1-adamantyl)-N'-[1(-dimethylaminoethoxycarbonyl)-ethyl]-urea, M.P. 131–133° C.

N-(1-adamantyl)-N'-[(1-methyl-piperidyloxy(-4))-carbonylmethyl]-urea, M.P. 121–125° C.

N-(1-adamantyl)-N'-[α-(3,6,9,12-tetraoxatridecanyloxycarbonyl)-ethyl]-urea, M.P. 52–54° C.

EXAMPLE XXI 0.05 gram sodium metal is dissolved in 50 ml. 2-dimethylamino-ethanol and to this is added with stirring 5 g. (0.0188 mol) N-(1-adamantyl)-N'-(carbomethoxymethyl)-urea. The mixture is stirred for 24 hours at room temperature and then the excess of 2-dimethylaminoethanol is distilled off under reduced pressure. The residual yellow oil is diluted with 50 ml. ligroin 30–45° C. whereupon crystallization occurs. The precipitate is filtered by suction and recrystallized from diisopropylether yielding 2.5 g. N-(1-adamantyl)-N'-(dimethylaminoethoxy-carbonyl-methyl)-urea, M.P. 101–102° C. The corresponding hydrochloride salt is obtained by treating this product with gaseous hydrochloric acid in ether, dec. 150–154° C.

EXAMPLE XXII 1 gram gaseous hydrochloric acid is dissolved in 50 ml. benzyl alcohol to which is added 2.66 g. (0.01 mol) of N-(1-adamantyl)-N'-(carbomethoxy-methyl)-urea. The mixture is allowed to stand for 2 days and then the excess of benzyl alcohol is distilled off under reduced pressure at a bath temperature of max. 100° C. The residue is diluted with 10 ml. toluene and allowed to stand for 5 hours. The precipitate is filtered by suction and recrystallized from 6 ml. toluene. After drying under reduced pressure, there are obtained 2.42 g. of N-(1-adamantyl)-N'-(carbobenzyloxy-methyl)-urea, M.P. 152–154° C.

With an equivalent quantity of n-propyl alcohol substituted for benzyl alcohol in the above procedure, there is obtained N-(1-adamantyl)-N'-(carbopropoxy-methyl)-urea, M.P. 133–135° C.; and with an equivalent quantity of 1-dodecyl alcohol, there is obtained N-(1-adamantyl)-N'-(carbododecyloxy-methyl)-urea, M.P. 86–88° C.

In the same manner as described herein, N-(1-adamantyl)-N'-(isopentoxy-carbonyl-ethyl)-urea is obtained by reaction of N-(1-adamantyl)-N'-(carbethoxy-ethyl)-urea with isopentyl alcohol, M.P. 100–102° C.

EXAMPLE XXIII

To a solution of 5.04 g. (0.02 mol) of N-(1-adamantyl)-N'-(carboxy-methyl)-urea in 35 ml. isopropyl alcohol is added a solution of 2.46 g. (0.0203 mol) of 3-dimethylamino-n-propyl chloride in 5 ml. isopropyl alcohol. The reaction mixture is refluxed for 10 hours. After this time the solvent is distilled off, finally under reduced pressure. The residue is dissolved by the addition of 100 ml. chloroform, 100 ml. water and 2 g. sodium carbonate. The chloroform layer is separated, extracted with 50 ml. water and dried over sodium sulfate. The solution is then concentrated and the residue diluted with 50 ml. ligroin 30–45° C. After standing for several hours, the precipitate is filtered by suction and recrystallized from 600 ml. of ligroin 60–90° C. After drying under reduced pressure there is obtained 1.7 g. N-(1-adamantyl)-N'-(dimethylaminopropoxy-carbonyl-methyl)-urea, M.P. 113–115° C.

In a similar manner, there is obtained N-(1-adamantyl) - N' - [10 - (dimethylaminopropoxy-carbonyl)-decyl (-1)]-urea, M.P. 87–89° C., by reaction of N-(1-adamantyl)-N'-[10-carboxy-decyl(-1)]-urea with 3-dimethylamino-n-propylchloride.

EXAMPLE XXIV

To a stirred solution of 4.5 g. (0.039 mol) of carbethoxyisocyanate [J. Org. Chem., 30, 4306 (1965)] in 20 ml. of absolute dioxane is added dropwise at a temperature of 20° C. a solution of 5.9 g. (0.039 mol) of 1-aminoadamantane in 65 ml. of absolute dioxane. The reaction mixture is stirred for 6 hours at room temperature, then filtered by suction and the filtrate concentrated under reduced pressure. The residue is recrystallized from 15 ml. of absolute ethanol. There is obtained 5.8 g. of N-(1-adamantyl)-N'-carbethoxy-urea, M.P. 142–144° C.

What is claimed is:
1. N-(1-adamantyl)-N'-(ethoxycarbonyl)-urea.

References Cited
UNITED STATES PATENTS 3,657,324   4/1972   Sheppard et al. _____ 260—482

LORRAINE A. WEINBERGER, Primary Examiner

R. GERSTL, Assistant Examiner